(12) United States Patent
Berger et al.

(10) Patent No.: US 8,605,868 B2
(45) Date of Patent: Dec. 10, 2013

(54) SYSTEM AND METHOD FOR EXTERNALLY MAPPING AN INTERACTIVE VOICE RESPONSE MENU

(71) Applicant: FonCloud, Inc., Toronto (CA)

(72) Inventors: Shai Berger, Toronto (CA); Jason P. Bigue, Toronto (CA)

(73) Assignee: FonCloud, Inc., Ontario (CA)

( * ) Notice: Subject to any disclaimer, the term of this patent is extended or adjusted under 35 U.S.C. 154(b) by 0 days.

(21) Appl. No.: 13/943,841

(22) Filed: Jul. 17, 2013

(65) Prior Publication Data

US 2013/0301815 A1 Nov. 14, 2013

Related U.S. Application Data

(63) Continuation of application No. 12/400,932, filed on Mar. 10, 2009, now Pat. No. 8,515,028, which is a continuation-in-part of application No. 12/276,621, filed on Nov. 24, 2008.

(60) Provisional application No. 61/035,195, filed on Mar. 10, 2008, provisional application No. 61/035,204, filed on Mar. 10, 2008, provisional application No. 60/989,908, filed on Nov. 23, 2007.

(51) Int. Cl.
*H04M 11/00* (2006.01)

(52) U.S. Cl.
USPC .................................. 379/88.14; 379/93.17

(58) Field of Classification Search
USPC ............. 379/142.01, 142.04, 142.09, 201.02, 379/210.02, 210.03, 211.01, 68, 88.11, 379/88.13, 88.14, 93.17, 201.01
See application file for complete search history.

(56) References Cited

U.S. PATENT DOCUMENTS

| | | | |
|---|---|---|---|
| 4,169,217 A | 9/1979 | Szanto et al. | |
| 4,228,324 A | 10/1980 | Rasmussen et al. | |
| 4,425,479 A | 1/1984 | Dubner et al. | |
| 4,731,822 A | 3/1988 | Berry, III et al. | |
| 4,834,551 A | 5/1989 | Katz | |
| 4,870,680 A | 9/1989 | Ohtsuka et al. | |
| 5,627,884 A | 5/1997 | Williams et al. | |
| 5,640,448 A | 6/1997 | Toyoshima | |
| 5,737,393 A | 4/1998 | Wolf | |
| 5,764,746 A | 6/1998 | Reichelt | |

(Continued)

FOREIGN PATENT DOCUMENTS

| | | |
|---|---|---|
| EP | 1156649 A | 11/2001 |
| JP | 2001285493 A | 10/2001 |

(Continued)

*Primary Examiner* — Olisa Anwah
(74) *Attorney, Agent, or Firm* — Carl M. Napolitano; Gray Robinson, P.A.

(57) ABSTRACT

An interactive voice response (IVR) mapping system (IVRMS) is used in a transaction between a waiting party and a queuing party, wherein the queuing party has a queuing calling system (QCS). The IVRMS communicates with the QCS for extracting navigational information from the QCS and generates an IVR map of the QCS. The IVRMS performs map validation by comparing the IVR map with extracted navigational information, and determines if a certain threshold of matching is not met. Optionally, a primary IVR map and a supplementary IVR map of the QCS are created. An editor corrects mistakes in an automated speech-to-text conversion process, removes text that is not relevant for visual navigation, corrects structure of an IVR map via adding, removes or changes commands, or a combination thereof.

36 Claims, 5 Drawing Sheets

(56) References Cited

U.S. PATENT DOCUMENTS

| | | |
|---|---|---|
| 5,802,526 A | 9/1998 | Fawcett et al. |
| 5,822,405 A | 10/1998 | Astarabadi |
| 6,031,905 A | 2/2000 | Furman et al. |
| 6,049,600 A | 4/2000 | Nabkel et al. |
| 6,104,797 A | 8/2000 | Nabkel et al. |
| 6,118,861 A | 9/2000 | Gutzmann et al. |
| 6,122,346 A | 9/2000 | Grossman |
| 6,141,328 A | 10/2000 | Nabkel et al. |
| 6,195,417 B1 | 2/2001 | Dans |
| 6,201,855 B1 | 3/2001 | Kennedy |
| 6,501,750 B1 | 12/2002 | Shaffer et al. |
| 6,512,852 B1 | 1/2003 | Wu et al. |
| 6,563,921 B1 | 5/2003 | Williams et al. |
| 6,584,184 B1 | 6/2003 | Nabkel et al. |
| 6,594,484 B1 | 7/2003 | Hitchings, Jr. |
| 6,643,641 B1 | 11/2003 | Snyder |
| 6,674,725 B2 | 1/2004 | Nabkel et al. |
| 6,684,224 B2 | 1/2004 | Meding et al. |
| 6,694,008 B1 | 2/2004 | Mukherji et al. |
| 6,724,885 B1 | 4/2004 | Deutsch et al. |
| 6,754,334 B2 | 6/2004 | Williams et al. |
| 6,757,260 B2 | 6/2004 | Pandit |
| 6,763,090 B2 | 7/2004 | Che et al. |
| 6,788,770 B1 | 9/2004 | Cook et al. |
| 6,804,342 B1 | 10/2004 | Gadant |
| 6,807,274 B2 | 10/2004 | Joseph et al. |
| 6,813,636 B1 | 11/2004 | Bean et al. |
| 6,836,478 B1 | 12/2004 | Huang et al. |
| 6,914,962 B2 | 7/2005 | Neary |
| 6,920,425 B1 | 7/2005 | Will et al. |
| 6,990,524 B1 | 1/2006 | Hymel |
| 6,999,944 B1 | 2/2006 | Cook |
| 7,027,408 B2 | 4/2006 | Nabkel et al. |
| 7,027,990 B2 | 4/2006 | Sussman |
| 7,065,203 B1 | 6/2006 | Huart et al. |
| 7,092,738 B2 | 8/2006 | Creamer et al. |
| 7,113,987 B2 | 9/2006 | Nabkel et al. |
| 7,120,244 B2 | 10/2006 | Joseph et al. |
| 7,130,411 B2 | 10/2006 | Brown et al. |
| 7,136,478 B1 | 11/2006 | Brand et al. |
| 7,174,011 B2 | 2/2007 | Kortum et al. |
| 7,215,759 B2 | 5/2007 | Brown et al. |
| 7,221,753 B2 | 5/2007 | Hutton et al. |
| 7,228,145 B2 | 6/2007 | Burritt et al. |
| 7,251,252 B2 | 7/2007 | Norby |
| 7,315,617 B2 | 1/2008 | Shaffer et al. |
| 7,349,534 B2 | 3/2008 | Joseph et al. |
| 7,414,981 B2 | 8/2008 | Jaramillo et al. |
| 7,715,531 B1 * | 5/2010 | Golding et al. ............ 379/88.18 |
| 8,155,276 B2 | 4/2012 | Beauregard et al. |
| 8,160,209 B2 | 4/2012 | Wang et al. |
| 8,290,125 B2 * | 10/2012 | Grigsby et al. ............ 379/88.18 |
| 2003/0112931 A1 | 6/2003 | Brown et al. |
| 2004/0202309 A1 | 10/2004 | Baggenstoss et al. |
| 2005/0147219 A1 | 7/2005 | Comerford |
| 2005/0147227 A1 | 7/2005 | Chervirala et al. |
| 2006/0095564 A1 | 5/2006 | Gissel et al. |
| 2006/0106613 A1 | 5/2006 | Mills |
| 2006/0126803 A1 | 6/2006 | Patel et al. |
| 2006/0245579 A1 | 11/2006 | Bienfait et al. |
| 2006/0256949 A1 | 11/2006 | Noble |
| 2007/0041564 A1 | 2/2007 | Antilli |
| 2007/0071223 A1 | 3/2007 | Lee et al. |
| 2007/0165608 A1 | 7/2007 | Altberg et al. |
| 2007/0280460 A1 | 12/2007 | Harris et al. |
| 2008/0039056 A1 | 2/2008 | Mathews et al. |
| 2008/0144786 A1 | 6/2008 | Wang et al. |
| 2008/0159495 A1 | 7/2008 | Dahan |
| 2009/0149158 A1 | 6/2009 | Goldfarb et al. |
| 2009/0154578 A1 | 6/2009 | Prakash |
| 2009/0154678 A1 | 6/2009 | Kewin et al. |
| 2010/0057456 A1 | 3/2010 | Grigsby et al. |
| 2011/0103559 A1 | 5/2011 | Andrews et al. |

FOREIGN PATENT DOCUMENTS

| | | |
|---|---|---|
| JP | 2004304770 A | 10/2004 |
| KR | 20040039586 A | 5/2004 |
| KR | 20040106487 | 12/2004 |
| KR | 1020050002930 | 1/2005 |

* cited by examiner

EDIT NODE                                                    X

QUEUING PARTY: ACME                          LAST VALIDATED:
NODE:                2                       2/3/08 11:22

PROMPT:         THANK YOU FOR
                CALLING US ...

COMMAND:    | 1 | TECH SUPPORT |
            | 2 | ADDRESS |

| DELETE NODE | ADD COMMAND | DELETE COMMAND | EDIT PROMPT TEXT |

*FIG. 4*

SYSTEM AND METHOD FOR EXTERNALLY MAPPING AN INTERACTIVE VOICE RESPONSE MENU

CROSS-REFERENCE TO RELATED APPLICATIONS

This application is a continuation of U.S. application Ser. No. 12/400,932 having a file date of Mar. 10, 2009, issuing as U.S. Pat. No. 8,515,028, which itself claims priority from U.S. Provisional Applications having Ser. Nos. 61/035,195 and 61/035,204, both filed on Mar. 10, 2008 and to U.S. Utility patent application Ser. No. 12,396,603, filed Mar. 3, 2009, which itself claims priority to Provisional Application Ser. No. 61/033,856, filed Mar. 5, 2008 and is a Continuation-In-Part of U.S. application Ser. No. 12/276,621, filed Nov. 24, 2008, which itself claims the benefit of U.S. Provisional Patent Application Ser. No. 60/989,908, filed Nov. 23, 2007, the disclosures of which are hereby incorporated by reference herein in their entireties and all commonly owned.

FIELD OF INVENTION

The present invention generally relates to communication call management and, more particularly to Interactive Voice Response (IVR) systems.

BACKGROUND

Today, when a user (a waiting party) calls a large company or service center (a queuing party), it is very likely that the user will be connected to an Interactive Voice Response (IVR) system. Such IVR systems present the waiting party with information via a series of audio prompts and obtain input from the caller via dual tone multi-frequency (DTMF) tones (also known as "touch tones") or verbal commands.

An "IVR map" is structured and lists all possible paths through a given IVR system, where each path includes one or more nodes. Each node in the map includes a prompt and possibly one or more commands. The prompt is the audio signal that is heard by the waiting party and is represented in the map by the corresponding text. A command allows the caller to navigate to another node. Examples of commands are DTMF tones and verbal commands. Each command will lead to another node in the IVR system, or will put the caller in a queue to speak to a live agent.

The strength of the IVR system is its universality. It works on any phone and is usable by even the least technically inclined people. IVR systems are favored by companies because they allow live agents to be used more effectively, which in turn reduces the costs of running call centers. Recent advances in technology are making IVR systems both easier to set up and more elaborate. Customer interactions that used to involve an agent, checking a bank balance or making a payment, by way of example, are being delegated more and more to the "automated attendant". It's clear that IVRs are going to be used for the foreseeable future.

However, IVR systems can be very frustrating to the waiting party. By way of example, companies are putting more and more marketing messages into their IVRs, which provide no value to the waiting party and increase the time it takes the user to accomplish desired objectives. Further, for really long menus, it can be hard for the waiting party to remember all the options by the time the menu is completed. Yet further, often the waiting party simply wants to speak to an agent, but the path to get there is not obvious. In fact, sometimes companies make reaching an agent deliberately obtuse.

SUMMARY

Embodiments of the present invention provide in one aspect an interactive voice response mapping system (IVRMS) used in a transaction between a waiting party and a queuing party, the queuing party having a queuing calling system (QCS), the IVRMS adapted to communicate with the QCS and to build an IVR map of the QCS.

In another aspect, embodiments provide a method used in a transaction between a waiting party and a queuing party, the queuing party having a QCS, the method comprising communicating with the QCS and building an IVR map of the QCS.

One embodiment may comprise an IVRMS adapted to communicate with the QCS for extracting navigational information from the QCS and at least partially generating an IVR map of the QCS, the IVRMS further adapted to perform map validation by comparing the IVR map with extracted navigational information, and determine if a certain threshold of matching is not met.

Optionally, the IVRMS may communicate with the QCS to extract navigational information from the QCS and generate IVR maps of the QCS, wherein primary and secondary IVR maps of the QCS are identified. The IVRMS may designate one queuing party as frequently changing and perform frequent IVR map validation for the queuing party.

A method aspect may comprise communicating with the QCS and extracting navigational information from the QCS and partially generating an IVR map of the QCS, and further performing map validation by comparing the IVR map with extracted navigational information, and determining if a certain threshold of matching is not met.

Optionally, map validation may be performed by comparing the IVR map with extracted navigational information, and determining if a certain threshold of matching is not met. Further, one queuing party may be designated as frequently changing, and frequent IVR map validation performed for the one queuing party.

BRIEF DESCRIPTION OF DRAWINGS

Embodiments of the invention are described by way of example with reference to the accompanying drawings, in which:

FIG. 4 illustrates an exemplary MEI screenshot; and

DETAILED DESCRIPTION OF EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The embodiments presented herein provide a system and method which allows the waiting party to review the IVR map of a queuing party in, e.g. in a visual way, thus saving time during the navigation process in a transaction which might be through a land phone, mobile phone, web-based phone, softphone, and the like.

Figure 1:
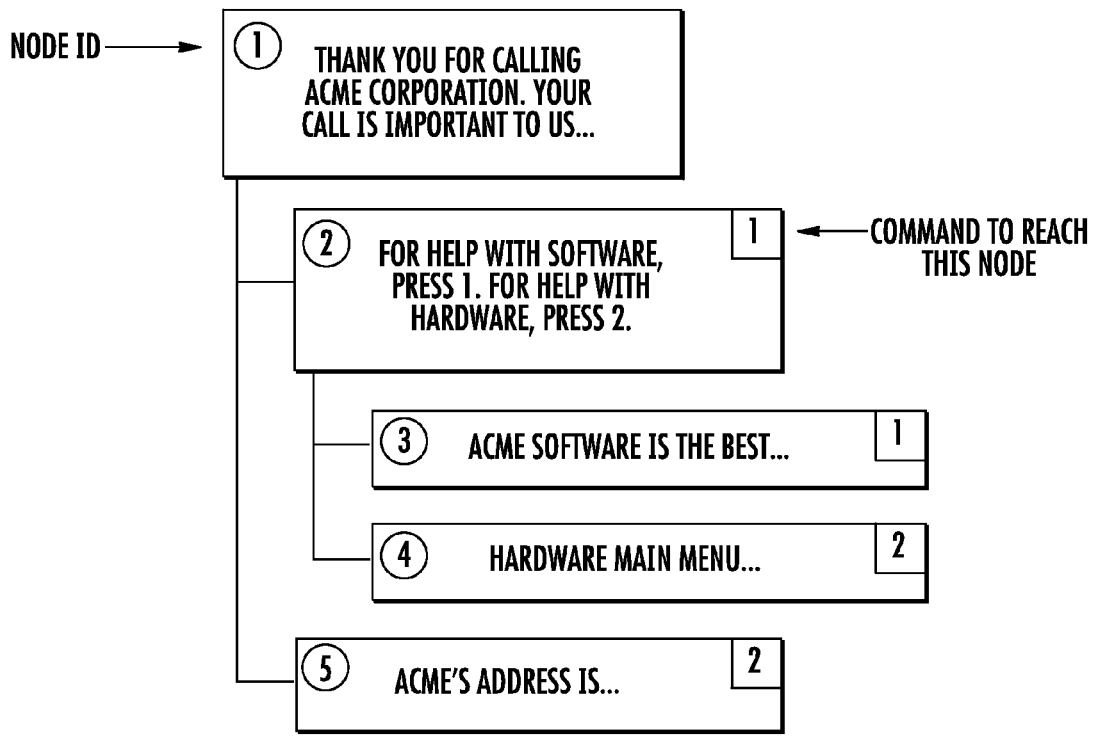
FIG. 1 is a flow chart illustrating an IVR map with commands and nodes.

Referring initially to FIG. 1, the queuing party may have the IVR map as herein illustrated, by way of example, and the waiting party may want to reach technical support for a hardware problem. By way of non-limiting example, the illustration of FIG. 1 makes it clear that after dialing, the waiting party needs to press "1" and then "2." This approach is faster when compared to dialing the number without the IVR map as a reference and listening through the menus. Because this example is simplified, the time savings is minimal, but in real-world cases, it can be much more substantial.

One difficulty in creating an IVR map is that, typically, the queuing party does not make available the contents of its IVR map in any way other than through dialing their phone system. Further, the queuing party may change the content or structure of its IVR map at any time. There is currently no system for notifying a third party of this change, hence an IVR map may become out-of-date at any time, without notice.

Figure 2:
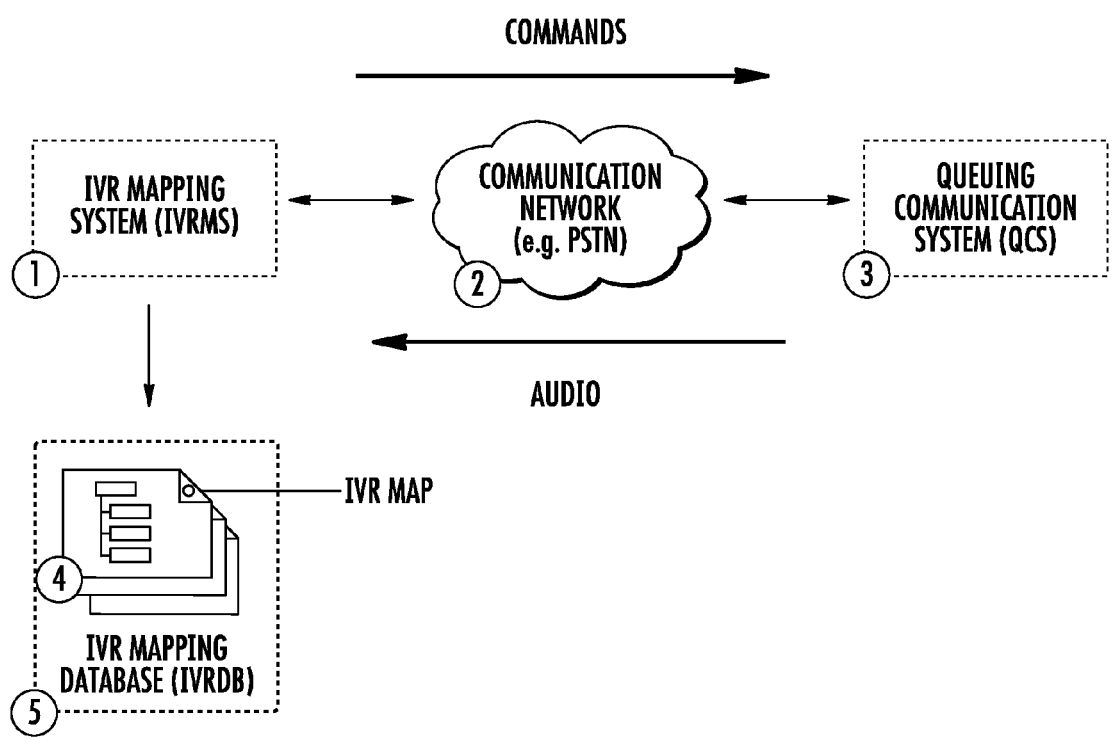
FIG. 2 is a flow chart illustrating an exemplary embodiment of an IVR mapping system (IVRMS) using a network to communicate with a QCS system and build an IVR map.

The embodiments presented herein provide a communications system referred to as the IVR mapping System (IVRMS) that is independent of the queuing party and of any telephone network carriers. FIG. 2 illustrates a functionality of an exemplary IVRMS 1. The IVRMS 1 connects through the communication network 2 (e.g. PSTN) with the queuing calling system (QCS) 3 of the queuing party (typically an IVR). The IVRMS generates an IVR map 4 for a given QCS which is in turn stored in a database called the IVR map Database (IVRMDB) 5.

It should be noted that present embodiments are applicable to landline phones, mobile and cellular phones, internet/web/IP-based phones or softphones etc. All the above devices could be identified with a voice address which could for example be a telephone number or an IP address. For instance, just as well as sending voice cues or composing numbers with a telephone, one could use data and software command transfer using internet/web/IP-based phones or softphones. It is therefore important to notice that the present embodiments relate to all these cases.

Functions of one IVRMS according to the teachings of the present invention may include: connection to the QCS over a communication network (e.g. PSTN); processing audio from the QCS and convert it to text or graphical representation; comparing the audio or text with existing IVR map, if one exists; extracting navigational information; and sending commands to the QCS (e.g. DTMF tones, voice cues, software commands, and the like).

The Editor

In some embodiments, the actions of the IVRMS are assisted by an editor. The tasks of the editor may include at least one correcting mistakes in the automated speech-to-text conversion process; removing text that is not relevant for visual navigation (e.g. "press star to repeat this menu"); correcting the structure of the IVR map by adding, removing or changing commands for particular nodes.

Figure 3:
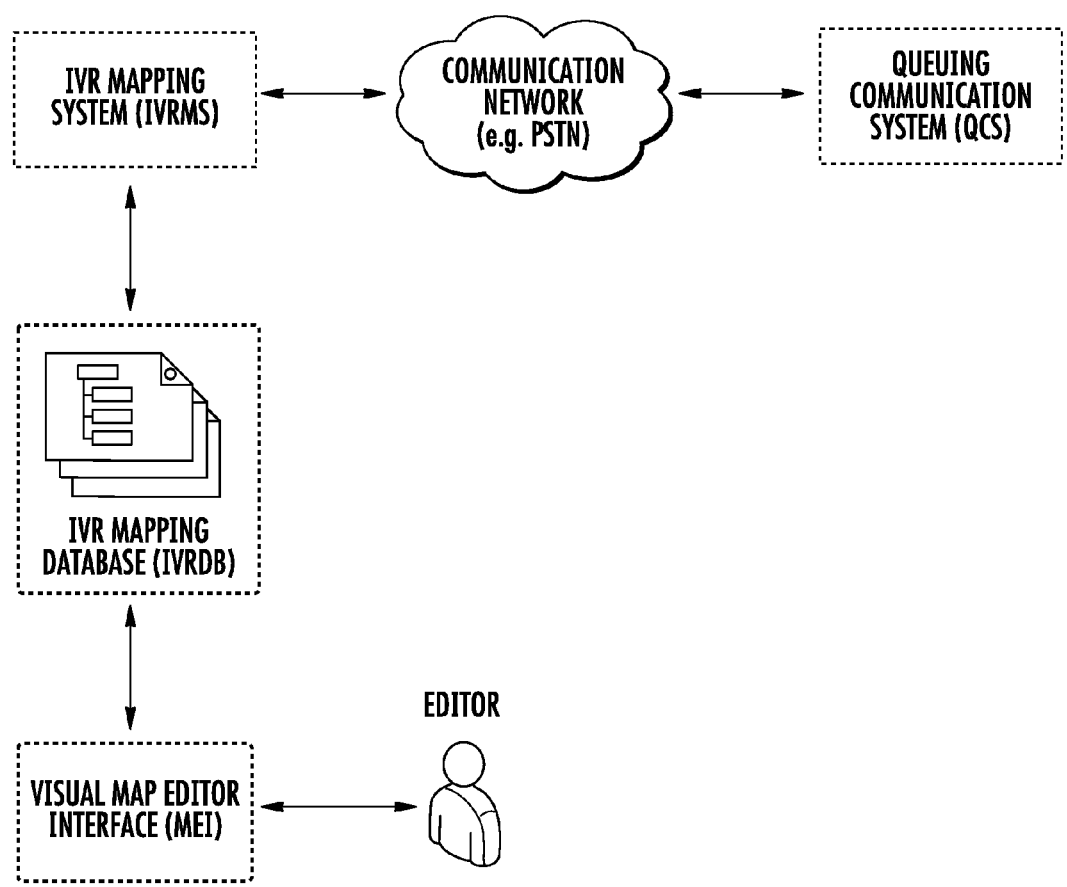
FIG. 3 is a flow chart illustrating an exemplary IVRMS with a capability option of being edited by an editor through a visual map editor interface (MEI)

In some embodiments, the editor is presented with a visual interface, namely the map editing interface (MEI) that facilitates the editor's work. FIG. 3 illustrates an illustrative example involving an MEI and other relevant components.

FIG. 4 illustrates an exemplary representation of an MEI screenshot that allows the editor to make appropriate changes to a node in the IVRMDB.

It should be noted that the editor might be a person, or it may also be a built-in software or hardware module inside the IVRMS, or an external software or hardware device interoperable with the IVRMS.

Map Validation

In some embodiments, the IVRMS performs a process called map validation, whereby it connects with the QCS and issues the appropriate commands to reach every node in the map. At each node, the IVRMS performs a process called node Validation whereby the incoming audio and/or text from a given node is compared with the stored audio and/or text for that node in the IVRMDB. If a certain threshold of matching is not met, then the node is flagged and, in some embodiments, an Editor is notified so that the node can be reviewed. The threshold levels may be set by the Editor on a per-node or per-map basis.

In some embodiments, map validation may be performed on a regular schedule for each queuing party.

In some embodiments, some queuing parties may be designated as "frequently changing", and hence require more frequent map validation.

Regular Time-Based Map Changes

Figure 5:
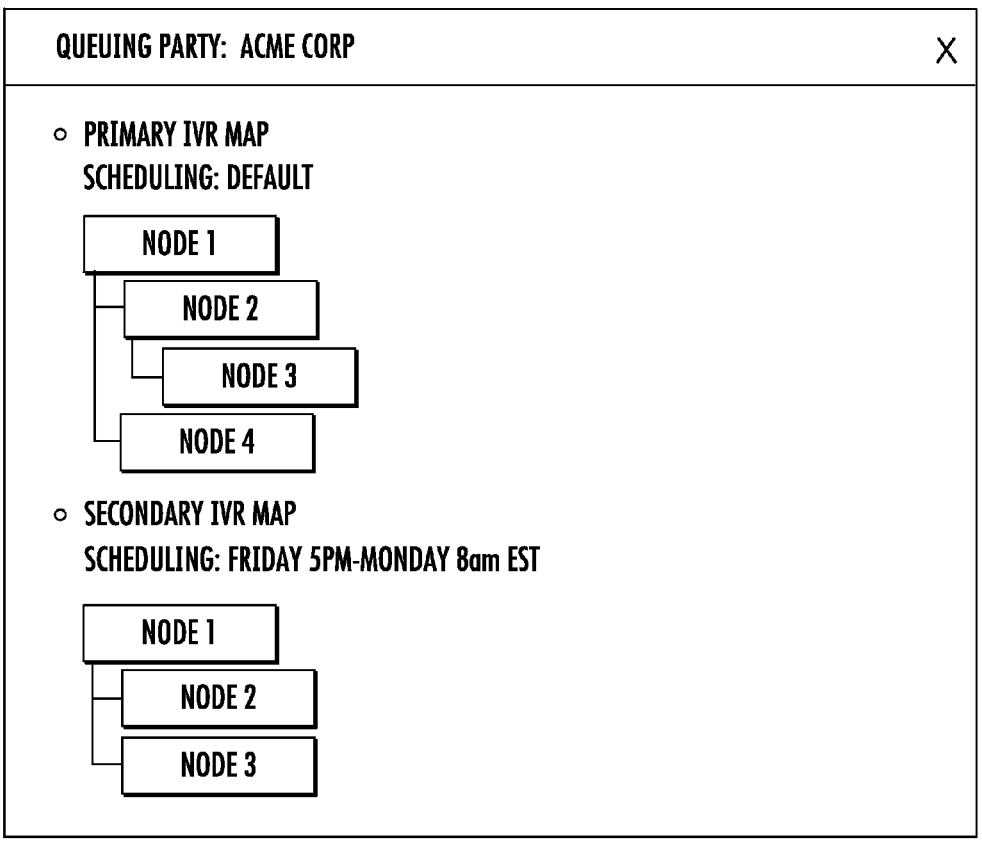
FIG. 5 illustrates an exemplary IVR database incorporating time-based IVR maps.

Some queuing parties may have regularly scheduled periods during which the IVR map is switched from the "primary IVR map" (the one heard the majority of the time) to a "supplementary IVR map". For example, waiting party may be presented with a supplementary IVR map on weekends or outside the office hours of the queuing party. In order to avoid unnecessary mapping effort, it is important for the IVRMS to recognize these supplementary IVR maps and not discard the primary IVR map. Some embodiments presented herein allow for such regular time-based changes by storing in the IVRMDB the supplementary IVR maps along with the scheduling information associated with each map. Indeed a queuing party may have multiple IVR maps corresponding to different time periods or for any other reason and the IVRMS recognizes and builds multiple IVR maps correspondingly. FIG. 5 illustrates an illustrative diagram of this relationship in the IVRMDB.

Non-Essential Text

Some queuing parties may have prompts in their IVR map where some of the text in the prompt changes frequently, even though the node's commands do not change. This text is referred to as "non-essential text". Some embodiments presented herein allow the editor to designate blocks of text as non-essential text in order to avoid unnecessary mapping effort.

One benefit of the embodiments presented herein is to provide a system and method that allows the creation of an IVR map for a queuing party in a way that requires no changes to the communication system of the queuing party.

Another benefit of the embodiments presented herein is to provide such a system and method in a way that is transparent to the queuing party, requires no negotiation with the queuing party and requires no cooperation from the queuing party.

Another benefit of the embodiments presented herein is to provide such a system and method in a way that stays synchronized with any changes to the company's IVR map.

Further, it will be understood by those of skill in the art that flowcharts and block diagrams herein described may illustrate architecture, functionality, and operation of possible implementations of systems, methods and computer program products according to various embodiments. Therefore, it will be understood that each block in the flowchart or block diagram may represent a module, segment, or portion of code, which comprises one or more executable computer program instructions for implementing the specified logical function or functions. Further, some implementations may include the functions in the blocks occurring out of the order as herein presented. By way of non-limiting example, two blocks shown in succession may be executed substantially concurrently, or the blocks may at times be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram. These computer program instructions may also be stored in a computer readable medium that may direct a computer, other programmable data processing apparatus, or other devices to function in a particular manner, such that the instructions stored in the computer readable medium produce an article of manufacture including instructions which implement the function or act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of various embodiments as herein presented, by way of example, may be embodied as a system, method or computer program product, and accordingly may take the form of a hardware embodiment, a software embodiment (including firmware, resident software, micro-code, and the like) or a combination thereof that may generally be referred to as a circuit, module or system. Furthermore, aspects of various embodiments may take the form of a computer program product embodied in one or more computer readable media having computer readable program code embodied thereon.

It is understood that a computer implemented method as may herein be described operates with readable media relating to non-transitory media, wherein the non-transitory computer-readable media comprise all computer-readable media, with the sole exception being a transitory, propagating signal.

Any combination of one or more computer readable media may be utilized. A computer readable medium may be a computer readable signal medium or a computer readable storage medium. A computer readable storage medium may be, by way of non-limiting example, an electronic, magnetic, optical, electromagnetic, infrared, or semiconductor system, apparatus, or device, or any suitable combination of the foregoing. More specific non-limiting examples of the computer readable storage medium may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, by way of non-limiting example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination thereof. Computer program code for carrying out operations for aspects of various embodiments may be written in any combination of one or more programming languages, including an object oriented programming language such as Java, Smalltalk, C++ or the like and conventional procedural programming languages, such as the C programming language or similar programming languages. The program code may also be written in a specialized language. The program code may execute entirely on the user's computer, partly on the user's computer, as a stand-alone software package, partly on the user's computer and partly on a remote computer, or entirely on the remote computer or server. The remote computer may be connected to the user's computer through any type of network, including a local area network (LAN) or a wide area network (WAN), or the connection may be made to an external computer, by way of non-limiting example, through the Internet using an Internet Service Provider.

Many modifications and other embodiments of the invention will come to the mind of one skilled in the art having the benefit of the teachings presented in the foregoing descriptions and associated drawings. Therefore, it is understood that the invention is not to be limited to the specific embodiments disclosed, and that modifications and embodiments are intended to be included within the scope of the appended claims.

That which is claimed is:

1. An interactive voice response mapping system (IVRMS) used in a transaction between a waiting party and a queuing party, the queuing party having a queuing calling system (QCS), the IVRMS adapted to communicate with the QCS for extracting navigational information from the QCS and at least partially generating an IVR map of the QCS, the IVRMS further adapted to perform map validation by comparing the IVR map with extracted navigational information, and to determine if a certain threshold of matching is not met.

2. The IVRMS of claim 1, wherein the IVRMS is adapted to at least partially correct the existing IVR map when the certain threshold of matching is not met.

3. The IVRMS of claim 1, wherein the IVRMS is adapted to process audio communications from the QCS and convert the audio communications to at least one of text and graphical representation.

4. The IVRMS of claim 1, wherein the IVRMS is adapted to compare audio communications from the QCS with the IVR map.

5. The IVRMS of claim 1, wherein the IVRMS is adapted to communicate at least one of DTMF tones, voice cues, and software commands with the QCS.

6. The IVRMS of claim 1, wherein the IVRMS is adapted to allow an editor to perform at least one of correcting mistakes in an automated speech-to-text conversion process, removing text that is not relevant for visual navigation, correcting the structure of an IVR map via adding, and removing or changing commands.

7. The IVRMS of claim 1, wherein the IVRMS designates at least one queuing party as frequently changing, and performs frequent IVR map validation for the at least one queuing party.

8. An interactive voice response mapping system (IVRMS) used in a transaction between a waiting party and a queuing party, the queuing party having a queuing calling system (QCS), the IVRMS adapted to communicate with the QCS to extract navigational information from the QCS and at least partially generate IVR maps of the QCS, wherein at least one primary IVR map and at least one supplementary IVR map of the QCS is identified.

9. The IVRMS of claim 8, wherein the IVRMS is adapted to test at least one of the primary IVR map and the supplementary IVR to identify when a certain threshold of matching is not met.

10. The IVRMS of claim 8, wherein the IVRMS is adapted to verify which one of the primary IVR map and the supplementary IVR map is in effect.

11. The IVRMS of claim 8, wherein the IVRMS is adapted to process audio communications from the QCS and convert the audio communications to at least one of text and graphical representation.

12. The IVRMS of claim 8, wherein the IVRMS is adapted to communicate at least one of DTMF tones, voice cues, and software commands with the QCS.

13. An interactive voice response mapping system (IVRMS) used in a transaction between a waiting party and a queuing party, the queuing party having a queuing calling system (QCS), the IVRMS adapted to communicate with the QCS to extract navigational information from the QCS and at least partially generate an IVR map of the QCS, wherein the IVRMS designates at least one queuing party as frequently changing, and performs frequent IVR map validation for the at least one queuing party.

14. The IVRMS of claim 13, wherein the IVRMS is adapted to perform additional IVR map validation under preselected circumstances.

15. The IVRMS of claim 13, wherein the IVRMS is adapted to process audio communications from the QCS and convert the audio communications to at least one of text and graphical representation.

16. The IVRMS of claim 13, wherein the IVRMS is adapted to communicate at least one of DTMF tones, voice cues, and software commands with the QCS.

17. The IVRMS of claim 13, wherein the IVRMS is adapted to compare audio communications from the QCS with the IVR map.

18. The IVRMS of claim 13, wherein the IVRMS is adapted to allow an editor to perform at least one of correcting mistakes in an automated speech-to-text conversion process, removing text that is not relevant for visual navigation, correcting the structure of an IVR map via adding, and removing or changing commands.

19. A method for interactive voice response mapping used in a transaction between a waiting party and a queuing party, the queuing party having a queuing calling system (QCS), the method comprising communicating with the QCS and extracting navigational information from the QCS and at least partially generating an IVR map of the QCS, and further performing map validation by comparing the IVR map with extracted navigational information, and determining if a certain threshold of matching is not met.

20. The method of claim 19, further comprising at least partially correcting the IVR map when the certain threshold of matching is not met.

21. The method of claim 19, further processing audio communications from the QCS and converting the audio communications to at least one of text and graphical representation.

22. The method of claim 19, further comparing audio communications from the QCS with the IVR map.

23. The method of claim 19, further communicating at least one of DTMF tones, voice cues, and software commands with the QCS.

24. The method of claim 19, further allowing an editor to perform at least one of correcting mistakes in an automated speech-to-text conversion process, removing text that is not relevant for visual navigation, correcting the structure of an IVR map via adding, and removing or changing commands.

25. The method of claim 19, further designating at least one queuing party as frequently changing, and performing frequent IVR map validation for the at least one queuing party.

26. A method for interactive voice response mapping used in a transaction between a waiting party and a queuing party, the queuing party having a queuing calling system (QCS), the method comprising communicating with the QCS and extracting navigational information from the QCS and at least partially generating IVR maps of the QCS, and further identifying at least one primary IVR map and at least one supplementary IVR map of the QCS.

27. The method of claim 26, further testing at least one of the primary IVR map and the supplementary IVR to identify when a certain threshold of matching is not met.

28. The method of claim 26, further verifying which one of the primary IVR map and the supplementary IVR map are in effect.

29. The method of claim 26, further processing audio communications from the QCS and converting the audio communications to at least one of text and graphical representation.

30. The method of claim 26, further communicating at least one of DTMF tones, voice cues, and software commands with the QCS.

31. A method for interactive voice response mapping used in a transaction between a waiting party and a queuing party, the queuing party having a queuing calling system (QCS), the method comprising communicating with the QCS and extracting navigational information from the QCS and at least partially generating an IVR map of the QCS, and further designating at least one queuing party as frequently changing, and performing frequent IVR map validation for the at least one queuing party.

32. The method of claim 31, further performing additional IVR map validation under specific circumstances.

33. The method of claim 31, further processing audio communications from the QCS and converting the audio communications to at least one of text and graphical representation.

34. The method of claim 31, further communicating at least one of DTMF tones, voice cues, and software commands with the QCS.

35. The method of claim 31, further comparing audio communications from the QCS with the IVR map.

36. The method of claim 31, further allowing an editor to perform at least one of correcting mistakes in an automated speech-to-text conversion process, removing text that is not relevant for visual navigation, correcting the structure of an IVR map via adding, and removing or changing commands.

* * * * *